United States Patent [19]
Dedrick

[11] Patent Number: 6,095,340
[45] Date of Patent: Aug. 1, 2000

[54] LAWN AND GARDEN PAN

[76] Inventor: Ted R Dedrick, 14135 Campo Rd., Jamul, Calif. 91935

[21] Appl. No.: 09/161,358

[22] Filed: Sep. 28, 1998

[51] Int. Cl.⁷ ....................................................... B07B 1/49
[52] U.S. Cl. .......................... 209/417; 209/418; 209/419; 209/614
[58] Field of Search .................................... 209/249, 614, 209/615, 417, 418, 419, 248, 243, 244, 245

[56] References Cited

U.S. PATENT DOCUMENTS

| | | | |
|---|---|---|---|
| 2,555,752 | 5/1951 | Merola | 294/49 |
| 4,988,005 | 1/1991 | Graham | 209/419 |
| 5,473,790 | 12/1995 | Desmarais | 15/257.7 |
| 5,701,844 | 12/1997 | Murphy | 119/166 |

*Primary Examiner*—Donald P. Walsh
*Assistant Examiner*—Jonathan R Miller
*Attorney, Agent, or Firm*—Charles C. Logan, II

[57] ABSTRACT

A lawn and garden pan having a substantially horizontal bottom wall panel having a substantially triangular configuration. The front end of the pan is open and it has numerous teeth extending forwardly along its entire length. The bottom wall panel has numerous sifting holes spread out over substantially its entire surface. The left and right side walls extend upwardly from the lateral edges of the bottom wall panel and their top ends curl outwardly and downwardly to form an inverted U-shaped configuration that forms a natural contour to seat between the palm of a person's hand and the thumb. A person can grip the pan for holding purposes along the entire length of the edges of the pan except its front end into which lawn debris can be raked or swept.

8 Claims, 1 Drawing Sheet

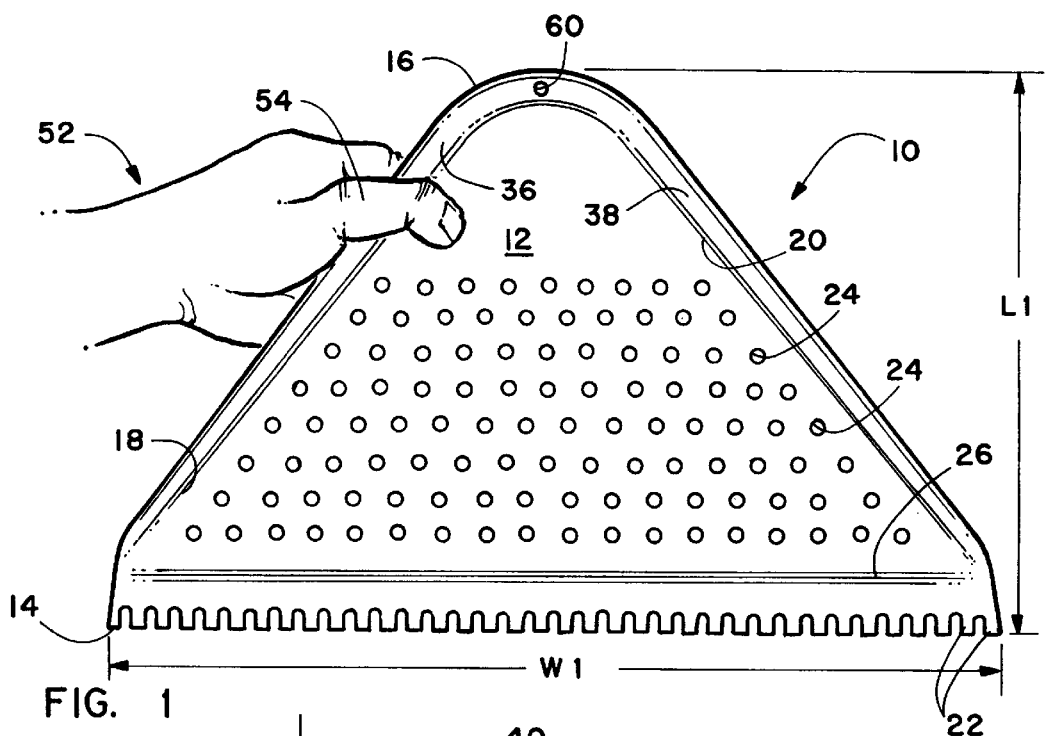
FIG. 1
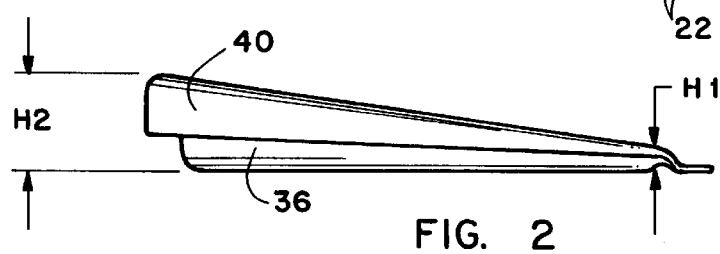
FIG. 2
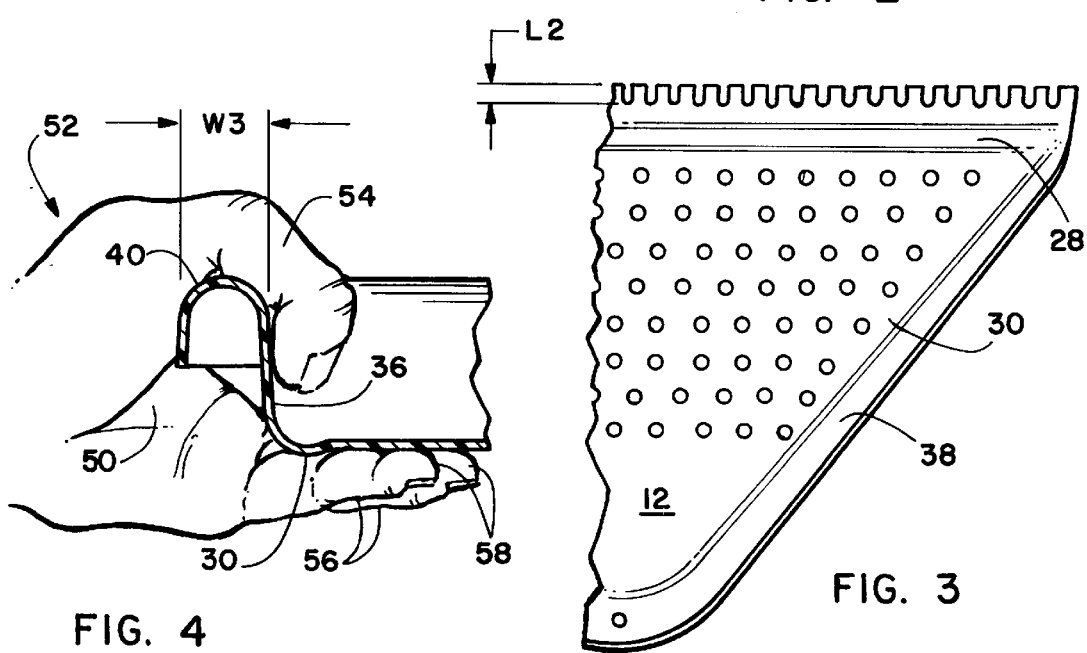
FIG. 3
FIG. 4

LAWN AND GARDEN PAN

BACKGROUND OF THE INVENTION

The invention relates to a pan and more specifically to one that would be used in the lawn and garden areas.

In the past there have been various structure for pans and other devices used for gathering leaves and other yard debris. Some of these also incorporated structure that allowed the dirt and other small particles to be sifted out of the debris. The Hatfield U.S. Pat. No. 3,877,742 discloses a leaf casket consisting of a pair of baskets which are open on one face and provided with interlocking teeth along their open faces to permit the baskets to be fitted together manually to secure leaves therebetween. The Check et al U.S. Pat. No. 4,378,670 discloses a pair of concave scoops that are operated by a person's hands which have teeth that function as rakes to assemble leaves, grass clippings and other debris into a pile that can then be disposed.

The Montez U.S. Pat. No. 4,828,690 discloses a hand tool having a tapered wedge head, an entrapment mesh supported by a carriage structure and cantilevered from the wedge head, and a handle adjustably coupled to the carriage structure.

The Graham U.S. Pat. No. 4,988,005 discloses a hand tool for sifting soil in gardens, recovering buried articles and other similar purposes where aggregate materials are picked up and filtered to separate the larger particles from smaller sized granules and powders. The Tyrrell U.S. Pat. No. 5,706,640 discloses a right and left plate member each having a rake end and a contoured end that are gripped respectively in a person's left and right hands for gathering and moving quantities of landscaping debris. other prior art devices have been designed to separate dirt from pet litter. The Halls et al design Pat. No. 255,951 discloses a solid separation scoop for use in cleaning pet litter. The Rigney U.S. design Pat. No. 256,173 discloses a litter scoop. The Lowe U.S. design Pat. No. 233,158 discloses a scoop for cleaning sanitary cat boxes.

It is an object of the invention to provide a novel lawn and garden pan into which leaves and other lawn debris can be raked and which allows dirt to be sifted therefrom.

It is also an object of the invention to provide a novel lawn and garden pan that can be used as a depository for weeds and which allows dirt from the weeds to be sifted through holes in the bottom wall panel of the pan.

It is another object of the invention to provide a novel lawn and garden pan into which garden vegetables can be placed and sprayed with water thereby removing dirt from them.

It is an additional object of the invention to provide a novel lawn and garden pan having unique structure which allows the user to grip the pan naturally between the user's palm of his hand and thumb.

It is a further object of the invention to provide a novel lawn and garden pan that is economical to manufacture and market.

It is another object of the invention to provide a novel lawn and garden pan that provides a natural hand gripping surface along its entire side wall and rear structure.

SUMMARY OF THE INVENTION

The novel lawn and garden pan has a substantially horizontal bottom wall panel having a substantially triangular configuration. The front end of the pan is open and it has forwardly extending teeth located across its entire length much in the form of the teeth of a rake. Left and right side walls extend upwardly from the respective left and right side edges of the bottom wall panel and they meet at the rear end of the bottom wall panel. There are a multitude of holes in the bottom wall panel that allow dirt to be sifted therethrough and water to pass therethrough. The left and right side walls increase in height from the front end of the bottom wall panel to it rear end.

The left and right side walls have a top end that curls outwardly and downwardly to form an inverted U-shaped configuration that forms a natural contour to seat between the palm of a person's hand and thumb. The remaining fingers of the person's hand may be extended beneath the bottom surface of the bottom wall panel to grip the lawn and garden pan. Some people may find it more comfortable to use the tips of the underlying fingers and press them against the ridge on the bottom surface of the bottom wall panel adjacent the respective side walls. The novel hand and finger gripping surface extends along the entire perimeter of the left and right side walls.

The lawn and garden pan would be light weight and preferably made of plastic material.

DESCRIPTION OF THE DRAWINGS

FIG. 1 illustrates the lawn and garden pan positioned vertically and held between a person's thumb, the palm of their hand and their remaining fingers;

FIG. 2 is a reduced sized side elevation view of the lawn and garden pan;

FIG. 3 is a partial bottom plan view of the lawn and garden pan; and

FIG. 4 is a cross sectional view of the lawn and garden pan left side wall illustrating the manner in which the thumb, palm of the hand and fingers grip the pan.

DESCRIPTION OF THE PREFERRED EMBODIMENT

The lawn and garden pan will now be described by referring to FIGS. 1–4 of the drawing. The lawn and garden pan is generally designated numeral 10.

Lawn and garden pan 10 has a bottom wall panel 12 having a generally triangular configuration with a front end 14, a rear end 16, a left side edge 18, and a right side edge 20. Teeth 22 extend from front end 14 along its entire length. A multitude of holes or apertures 24 are formed in bottom wall panel 12. The teeth 22 have a length L2 in the range of 0.5–1.5 inches and a width W2 in the range of 0.1–0.4 inches.

A strengthening ridge 26 extends upwardly from the top surface of bottom wall panel 12 and extends across the front end 14 immediately rearwardly of the teeth 22. The bottom surface of bottom wall panel 12 beneath ridge 26 has an elongated channel or groove 28. The lawn and garden pan has a length L1 in the range of 8–18 inches and a width W1 in the range of 12–28 inches. The apertures 24 have a diameter D1 in the range of 0.1–0.5 inches. The bottom surface of bottom wall panel 12 has a ridge 30 that provides a finger gripping surface thereon.

Extending upwardly from the respective left and right edges 18 and 20 of bottom wall panel 12 are the respective left and right side walls 36 and 38. The respective side walls have a curled top edge 40 that curls outwardly and downwardly to form an inverted U-shaped configuration that forms a natural contour to seat between the palm 50 of a person's hand 52 and their thumb 54. The other fingers 56 extend underneath the bottom surface of the bottom wall panel 12. Some people prefer to use their finger tips 58 and press them against the finger gripping ridge 30. Curled edge 40 has a width W3 in the range of 0.6–2.0 inches. The height of the side walls increases from the front end of the bottom wall panel 12 to its rear end. The height H1 at the front end of the respective side walls is in the range of 0.5–1.5 inches. The height H2 at the rear end of the respective side walls is in the range of 1.0–2.5 inches.

An aperture 60 is formed adjacent the rear end of the lawn and garden pan 10 for hanging it on a hook.

What is claimed is:

1. A lawn and garden pan comprising:

a substantially horizontal bottom wall panel having a top surface, a bottom surface, a front end, a rear end, a left edge and a right edge; said left edge and said right edge taper toward each other from said front end to said rear end to give said bottom wall panel a substantially triangular configuration; said bottom wall panel having a length (L1) in the range of 8–18 inches and a width (W1) in the range of 12–28 inches; and a left side wall extends upwardly from said left edge of said bottom wall panel and a right side wall extends upwardly from said right edge of said bottom wall panel; said left and right side walls increase in height from said front end of said bottom wall panel to said rear end of said bottom wall panel; said front end of said left and right side walls having a height (H1) in the range of 0.5–1.5 inches and said rear end of said left and right side walls having a height (H2) in the range of 1.0–2.5 inches; said left and right side walls have a top end that curls outwardly and downwardly to form a curled edge that has an inverted U-shaped configuration that forms a natural curved convex contour to seat between the palm of a person's hand and the thumb said curled edge has a width (W3) in the range of 0.6–2.0 inches; and said curled edge extends along said entire length of said left and right side walls.

2. A lawn and garden pan as recited in claim 1 wherein said front end of said bottom wall panel has teeth extending forwardly from said front end substantially across its entire length.

3. A lawn and garden pan as recited in claim 2 wherein said teeth have a length (L2) in the range of 0.5–1.5 inches and a width W2 in the range of 0.1–0.4 inches.

4. A lawn and garden pan as recited in claim 3 further comprising an upwardly extending structural ridge on said top surface of said bottom wall panel, said structural ridge being positioned immediately rearward of said teeth and extending substantially across the entire front end of said bottom wall.

5. A lawn and garden pan as recited in claim 4 wherein said lawn and garden pan is made of plastic material.

6. A lawn and garden pan as recited in claim 5 further comprising an aperture in said pan adjacent said rear end where said top ends of said left and right side walls meet.

7. A lawn and garden pan as recited in claim 1 further comprising at least 30 material sifting apertures in said bottom wall panel.

8. A lawn and garden pan as recited in claim 7 wherein said material sifting apertures have a diameter D1 in the range of 0.1–0.5 inches.

* * * * *